United States Patent
Shimoi et al.

(10) Patent No.: US 8,527,315 B2
(45) Date of Patent: Sep. 3, 2013

(54) OPERATION SUPPORT APPARATUS, OPERATION SUPPORT METHOD, AND COMPUTER PROGRAM

(75) Inventors: Shinichirou Shimoi, Tokyo (JP); Hideto Nakamura, Tokyo (JP); Isao Oshita, Tokyo (JP)

(73) Assignee: Nippon Steel & Sumitomo Metal Corporation, Tokyo (JP)

( * ) Notice: Subject to any disclaimer, the term of this patent is extended or adjusted under 35 U.S.C. 154(b) by 0 days.

(21) Appl. No.: 13/132,848

(22) PCT Filed: Dec. 2, 2010

(86) PCT No.: PCT/JP2010/071578
§ 371 (c)(1),
(2), (4) Date: Jun. 3, 2011

(87) PCT Pub. No.: WO2011/070967
PCT Pub. Date: Jun. 16, 2011

(65) Prior Publication Data
US 2012/0004952 A1  Jan. 5, 2012

(30) Foreign Application Priority Data
Dec. 7, 2009 (JP) ................. 2009-277795

(51) Int. Cl.
*G06Q 10/00* (2006.01)
(52) U.S. Cl.
USPC ...................................... 705/7.26
(58) Field of Classification Search
USPC ............................. 705/7.42, 7.26
See application file for complete search history.

(56) References Cited

U.S. PATENT DOCUMENTS

| | | | |
|---|---|---|---|
| 2002/0065702 A1* | 5/2002 | Caulfield | 705/9 |
| 2005/0216331 A1* | 9/2005 | Ahrens et al. | 705/11 |
| 2006/0282305 A1* | 12/2006 | Gibson | 705/11 |
| 2007/0192157 A1* | 8/2007 | Gooch | 705/9 |
| 2009/0192843 A1* | 7/2009 | Ayala et al. | 705/7 |

FOREIGN PATENT DOCUMENTS

| | | |
|---|---|---|
| EP | 0 292 934 A2 | 11/1988 |
| JP | 2002-224922 A | 8/2002 |
| JP | 2003-271225 A | 9/2003 |

(Continued)

OTHER PUBLICATIONS

Forms PCT/IB/338, PCT/IB/373 and PCT/ISA/237, mailed Jul. 19, 2012, for International Application No. PCT/JP2010/071578.

(Continued)

*Primary Examiner* — Johnna Loftis
(74) *Attorney, Agent, or Firm* — Birch, Stewart, Kolasch & Birch, LLP

(57) ABSTRACT

For each of tasks performed in an operation of manufacturing equipment, a proficiency of a worker with respect to a task to be performed is obtained from a proficiency DB (120) storing proficiencies of workers with respect to the tasks. A guidance base time (314) determined based on a manufacturing schedule is controlled corresponding to the proficiency of the worker, a guidance control time (334) corresponding to the proficiency of the worker is determined, and guidance is outputted at the guidance control time (334). The proficiency of the worker with respect to the task is corrected based on task record information (340) including a task content and a task time of a task performed by the worker and on the guidance control time (334), and the proficiency of the worker with respect to the task stored in the proficiency DB (120) is updated.

9 Claims, 12 Drawing Sheets

(56) References Cited

FOREIGN PATENT DOCUMENTS

| | | |
|---|---|---|
| JP | 2004-310210 A | 11/2004 |
| JP | 2007-301679 A | 11/2007 |
| JP | 2008-9834 A | 1/2008 |
| JP | 2008-159039 A | 7/2008 |

OTHER PUBLICATIONS

Supplemenatry European Search Report dated May 21, 2013 (7 pages).

* cited by examiner

FIG. 2
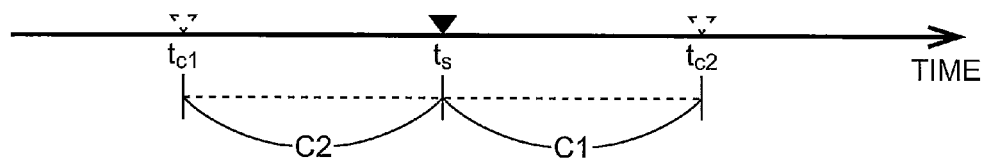
FIG. 3
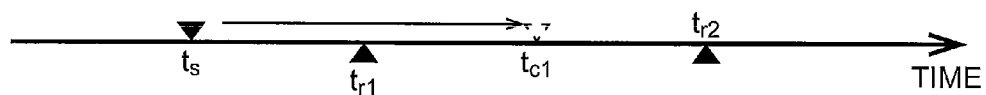
FIG. 4
120
| | WORKER A | | | | | | | |
|---|---|---|---|---|---|---|---|---|
| TASK ID | 0001 | 0002 | 0003 | ... | ... | ... | ... | ... |
| | 3 | 3 | 3 | ... | ... | ... | ... | ... |
| | 3 | 3 | 3 | ... | ... | ... | ... | ... |
| PROFICIENCY | : | : | : | ... | ... | ... | ... | ... |
WORKER B
WORKER X

| TASK ID \ PROFICIENCY | 1 | 2 | 3 | 4 | 5 |
|---|---|---|---|---|---|
| 0001 | −20 | −10 | 0 | 10 | 20 |
| 0002 | −10 | −5 | 0 | 5 | 10 |
| 0003 | −30 | −20 | 0 | 20 | 30 |
| ⋮ | ⋮ | ⋮ | ⋮ | ⋮ | ⋮ |

| TASK ID (151) | DATA ITEM (152) | CONTENT (153) | INPUT SOURCE (154) | RECORD VALID PERIOD (SEC) (155) |
|---|---|---|---|---|
| 0001 | CLEANING LIQUID VALVE | CLOSE | SCREEN | 120 |
| 0002 | LEVELER AUTOMATIC | OFF | ACTION DETERMINATION | 30 |
| 0003 | WELDING CONDITION | CHECK | AUDIO | 60 |
| ⋮ | ⋮ | ⋮ | ⋮ | ⋮ |

| TASK ID \ PROFICIENCY CORRECTION AMOUNT | −2 | −1 | 0 | +1 | +2 |
|---|---|---|---|---|---|
| 0001 | 20< | 10< | ±10 | −10> | −20> |
| 0002 | 10< | 5< | ±5 | −5> | −15> |
| 0003 | 30< | 20< | ±20 | −20> | −40> |
| ⋮ | ⋮ | ⋮ | ⋮ | ⋮ | ⋮ |

| TASK ID | 0001 | 0002 | 0003 | 0004 | 0005 | ⋯ |
|---|---|---|---|---|---|---|
| LEARNING METHOD | EXPONENTIAL SMOOTHING | EXPONENTIAL SMOOTHING | EXPONENTIAL SMOOTHING | MOVING AVERAGE | EXPONENTIAL SMOOTHING | |
| PARAMETER 1 | 0.7 | 0.7 | 0.7 | 10 | 0.7 | |
| PARAMETER 2 | — | — | — | — | — | |
| PARAMETER 3 | — | — | — | — | — | |
| PARAMETER 4 | — | — | — | — | — | |
| PARAMETER 5 | — | — | — | — | — | |
| ⋮ | ⋮ | ⋮ | ⋮ | ⋮ | ⋮ | |

| TASK ID | GUIDANCE CONTENT | GUIDANCE TIMING | GUIDANCE BASE TIME |
|---|---|---|---|
| 0001 | PLEASE STOP CLEANING LIQUID | COMPLETION OF WELDING | 2009.08.19 13:23:40 |
| 0002 | PLEASE SWITCH LEVELER AUTOMATIC TO "OFF" | 30 SEC PRIOR TO REACHING PLATING ZONE | 2009.08.19 13:48:21 |
| 0003 | PLEASE CHECK WELDING CONDITION | 300 M BEFORE WELDING | 2009.08.19 16:03:52 |
| ... | ... | ... | ... |
| ... | ... | ... | ... |
| ... | ... | ... | ... |
| ... | ... | ... | ... |
| ... | ... | ... | ... |
| ... | ... | ... | ... |

| TASK ID (321) | TASK START TIME (322) | TASK FINISH TIME (323) |
|---|---|---|
| A | 2009.08.19 07:05:10 | 2009.08.19 15:00:40 |
| B | 2009.08.19 15:00:40 | 2009.08.19 23:08:02 |
| ⋮ | ⋮ | ⋮ |
| A | 2009.08.20 07:01:23 | 2009.08.19 15:08:02 |
| B | 2009.08.19 15:08:02 | 2009.08.19 23:06:43 |
| ⋮ | ⋮ | ⋮ |

| WORKER ID | TASK ID | GUIDANCE BASE TIME | GUIDANCE CONTROL TIME | ACTUAL OUTPUT |
|---|---|---|---|---|
| 331 | 332 | 333 | 334 | 335 |
| A | 0001 | 2009.08.19 13:23:40 | 2009.08.19 13:23:40 | 1 |
| A | 0002 | 2009.08.19 13:48:21 | 2009.08.19 13:48:21 | 1 |
| B | 0003 | 2009.08.19 16:03:52 | 2009.08.19 16:03:52 | 0 |
| ... | ... | ... | ... | ... |
| ... | ... | ... | ... | ... |
| ... | ... | ... | ... | ... |
| ... | ... | ... | ... | ... |
| ... | ... | ... | ... | ... |
| ... | ... | ... | ... | ... |

| WORKER ID (341) | TIME (342) | TASK ID (343) |
|---|---|---|
| A | 2009.08.19 13:23:55 | 0001 |
| A | 2009.08.19 13:48:18 | 0002 |
| B | 2009.08.19 16:01:52 | 0003 |
| ⋮ | ⋮ | ⋮ |
| ⋮ | ⋮ | ⋮ |
| ⋮ | ⋮ | ⋮ |
| ⋮ | ⋮ | ⋮ |
| ⋮ | ⋮ | ⋮ |
| ⋮ | ⋮ | ⋮ |
| ⋮ | ⋮ | ⋮ |
| ⋮ | ⋮ | ⋮ |

FIG. 16

| | | | | | | | | |
|---|---|---|---|---|---|---|---|---|
| | | | | WORKER X | | | | |
| | | | WORKER B | | | | | |
| | | WORKER A | | | | | | |
| TASK ID | 0001 | 0002 | 0003 | ... | ... | ... | ... | ... |
| PROFICIENCY | 2 | 3 | 3 | ... | ... | ... | ... | ... |
| | 3 | 3 | 3 | ... | ... | ... | ... | ... |
| | ⋮ | ⋮ | ⋮ | ... | ... | ... | ... | ... |

120

OPERATION SUPPORT APPARATUS, OPERATION SUPPORT METHOD, AND COMPUTER PROGRAM

TECHNICAL FIELD

The present invention relates to an operation support apparatus, an operation support method, and a computer program for supporting an operation in which execution timings are determined in advance, such as an operation of manufacturing equipment.

BACKGROUND ART

In manufacturing industry or the like such as steel industry, workers carry out an operation by manipulating and managing manufacturing equipment including various apparatuses and so on which form manufacturing processes. In recent years, accompanying advancement of manufacturing processes, manipulation contents of workers are sophisticated and advanced. Accordingly, guidance on manipulation contents is given to a worker who carries out the operation, so as to alleviate a manipulation load on the worker and prevent a manipulation mistake.

Among workers occupied with an operation, while there are ones skilled in manipulations thereof, there are also ones unskilled in the manipulations. Accordingly, there has been proposed an approach to provide operation support considering the proficiencies of workers, so as to perform more appropriate operation support. For example, Patent Document 1 discloses a presenting information determining system which evaluates the proficiency of a worker by the success rate with respect to a manufacturing target value of a semi-manufactured product, which is produced through an operation performed by the worker, and determines details of operation instruction content depending on this proficiency. Further, Patent Document 2 discloses a task support system which stores the proficiency of a worker and ID of the worker in correlation with each other, and determines the content of display for a task procedure based on the stored proficiency.

CITATION LIST

Patent Literature

Patent Document 1: Japanese Laid-open Patent Publication No. 2008-159039
Patent Document 2: Japanese Laid-open Patent Publication No. 2008-9834

SUMMARY OF THE INVENTION

Technical Problem

However, in the systems of the above-described patent documents, the skill of a worker is evaluated as proficiency. Therefore, when the content of guidance is changed depending on such proficiency, although there is a certain degree of effect to prevent a manipulation mistake, the system does not provide suitable support for carrying out job processes in a well-planned manner. For example, giving detailed task instructions to a worker with low proficiency provides an effect to reduce errors, but the worker performs a task while checking the detailed instructions one-by-one, which reduces the task efficiency. Further, presenting a self-explanatory instruction frequently is, even when it is simple guidance, merely a disturbance for a skilled person who has the content of task already set up in his/her mind, and thus may adversely induce a failure of manipulation or cause decrease in efficiency.

Accordingly, the present invention is made in view of the above-described problems, and it is an object of the present invention to enable giving guidance on a manipulation content at an appropriate timing based on a proficiency related to operation know-how of a worker.

Solution to Problem

To solve the above-described problems, according to an aspect of the present invention, there is provided an operation support apparatus performing processing using a computer for giving guidance to a worker carrying out an operation in which execution timings for respective tasks are determined in advance. This operation support apparatus includes: a proficiency storage unit storing, for each of workers, proficiencies with respect to tasks performed in the operation and determined corresponding to a difference between an output time of guidance related to a task and a task record time for the task; a guidance output unit obtaining a proficiency of a worker with respect to a task to be performed from the proficiency storage unit, controlling corresponding to the proficiency of the worker a base output timing of guidance with respect to the task determined based on an operation schedule and determining a control output timing corresponding to the proficiency of the worker, and instructing an output device to output the guidance to the worker at the control output timing; a task record collecting unit creating task record information containing a task content and a task time of a task performed by the worker; and a proficiency determining unit correcting the proficiency of the worker with respect to the task based on the control output timing of the guidance and the task time contained in the task record information, and updating the proficiency of the worker with respect to the task stored in the proficiency storage unit, in which the guidance output unit obtains a latest proficiency from the proficiency storage unit when the proficiency of the worker with respect to the task to be performed is updated by the proficiency determining unit.

According to the present invention, guidance is outputted at a timing corresponding to the proficiency of a worker. Further, since the proficiency is updated by the proficiency determining unit based on a task time contained in a task record of the worker and the control output timing set by the guidance output unit, the operation support apparatus is able to output the guidance at an appropriate timing based on the latest proficiency of the worker.

Here, the guidance output unit may set the control output timing at a point later than the base output timing for guidance of a task for which a corresponding proficiency among the proficiencies is high, and set the control output timing at a point earlier than the base output timing for guidance of a task for which a corresponding proficiency among the proficiencies is low.

Further, when a task record indicating that the task is performed by the worker at a point earlier than the control output timing is detected from the task record information, the guidance output unit does not output guidance of the task.

Furthermore, the operation support apparatus may include a worker identifying unit identifying a worker in operation and outputting a worker ID specifying the identified worker to the guidance output unit. Here, the guidance output unit obtains a proficiency of the worker with respect to a task to be performed from the proficiency storage unit based on a task ID specifying a task content to be notified to the worker by guidance outputted at the base output timing and the worker ID inputted from the worker identifying unit.

Further, the proficiency determining unit increases the proficiency of the worker with respect to the task when the task time is earlier than the control output timing, and decreases the proficiency of the worker with respect to the task when the task time is later than the control output timing.

Furthermore, the proficiency determining unit may calculate a difference between the control output timing and the task time, and determine a size of a correction amount of the proficiency corresponding to a size of the difference.

For example, the proficiency determining unit may calculate the proficiency after the update by an exponential smoothing method based on a correction amount of the proficiency and a proficiency already obtained before being corrected with the correction amount of the proficiency or by a moving average method based on a history of corrected proficiencies prior to moving averaging, which are values resulting from correcting a proficiency prior to calculation of a moving average, the proficiency obtained just before the calculation is performed, by a correction amount of the proficiency.

Further, to solve the above-described problems, according to another aspect of the present invention, there is provided an operation support method performing processing using a computer for giving guidance to a worker carrying out an operation in which execution timings for respective tasks are determined in advance. This operation support method includes: obtaining a proficiency of a worker with respect to a task to be performed from a proficiency storage unit storing proficiencies with respect to tasks performed in the operation and determined corresponding to a difference between an output time of guidance related to a task and a task record time for the task; controlling corresponding to the proficiency of the worker a base output timing of guidance with respect to the task determined based on an operation schedule and determining a control output timing corresponding to the proficiency of the worker; instructing an output device to output the guidance to the worker at the control output timing; creating task record information containing a task content and a task time of a task performed by the worker; correcting the proficiency of the worker with respect to the task based on the control output timing of the guidance and the task time contained in the task record information; and updating the proficiency of the worker with respect to the task stored in the proficiency storage unit, in which in the obtaining of a proficiency, a latest proficiency is obtained from the proficiency storage unit when the proficiency of the worker with respect to the task to be performed is updated.

Furthermore, to solve the above-described problems, according to another aspect of the present invention, there is provided a computer program causing a computer to execute the processing of the operation support method. Such a computer program is stored in a storage device provided in a computer, and causes this computer to function as the above-described operation support apparatus by being read into and executed by a CPU provided in the computer. Further, there is also provided a computer readable recording medium in which this program is recorded.

The recording medium is, for example, a magnetic disk, an optical disk, or the like.

Advantageous Effects of Invention

According to the present invention, it becomes possible to give guidance of a manipulation content at an appropriate timing based on a proficiency determined corresponding to the difference between an output time of guidance with respect to a task and a task record time of this task.

BRIEF DESCRIPTION OF DRAWINGS

FIG. 2 is an explanatory diagram conceptually illustrating an example of an adjusting method of an output timing of guidance by the operation support apparatus according to this embodiment;

FIG. 3 is an explanatory diagram illustrating an example of the relation between the output timing of guidance by the operation support apparatus according to this embodiment and a correction amount of proficiency;

FIG. 4 is an explanatory diagram illustrating an example of a structure of a proficiency DB;

FIG. 5 is an explanatory diagram illustrating an example of a structure of a guidance output definition table;

FIG. 6 is an explanatory diagram illustrating an example of a structure of a task determination definition table;

FIG. 7 is an explanatory diagram illustrating an example of a structure of a proficiency determination definition table;

FIG. 8 is an explanatory diagram illustrating an example of a structure of a proficiency learning definition table;

FIG. 9 is an explanatory diagram illustrating an example of a structure of guidance schedule information;

FIG. 10 is an explanatory diagram illustrating an example of a structure of operator information;

FIG. 11 is an explanatory diagram illustrating an example of a structure of guidance output record information;

FIG. 12 is an explanatory diagram illustrating an example of a structure of task record information;

FIG. 16 is an explanatory diagram illustrating an example of the proficiency DB after update.

DESCRIPTION OF EMBODIMENTS

Figure 1:
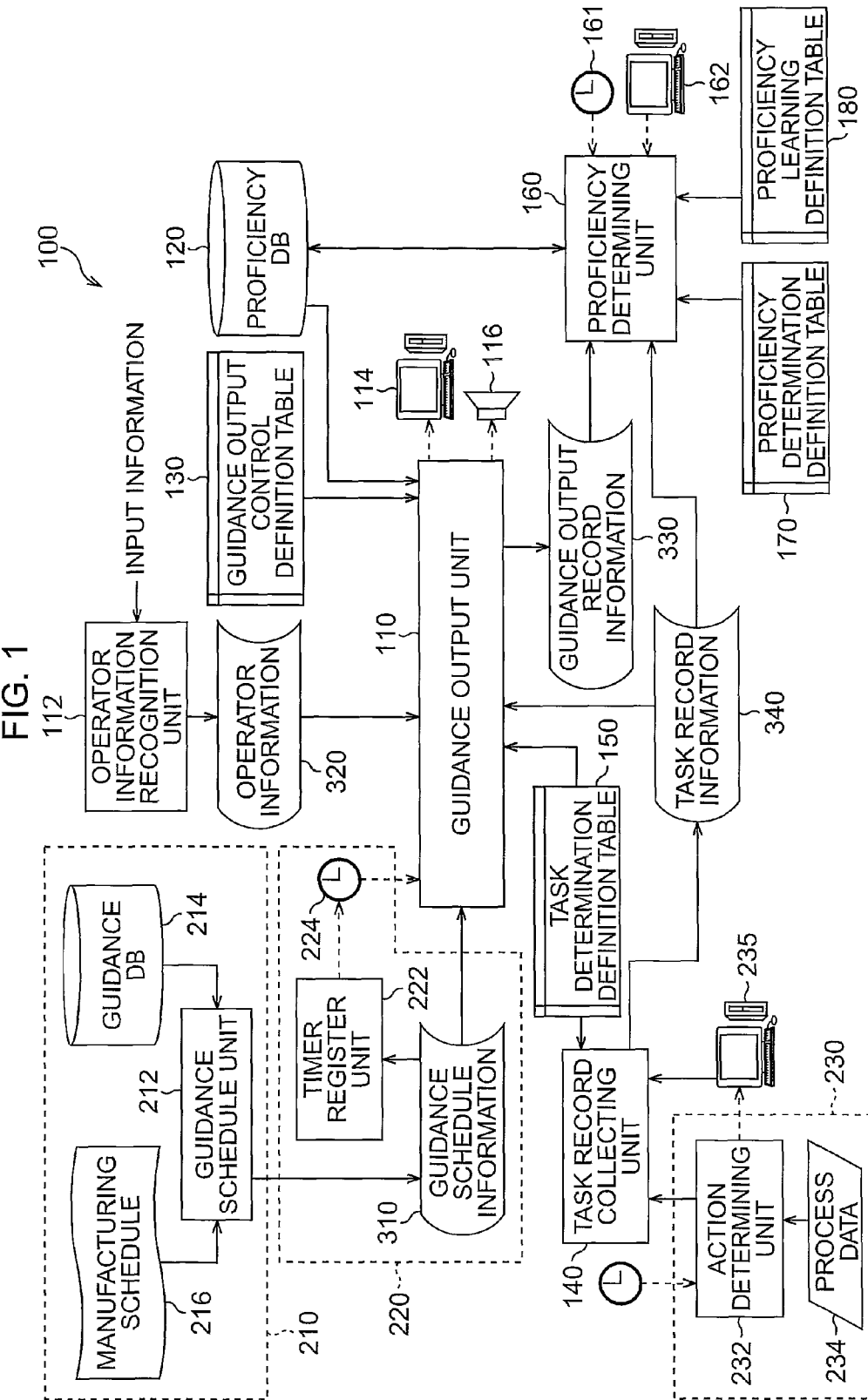
FIG. 1 is a block diagram illustrating an example of a structure of an operation support apparatus according to an embodiment.

Hereinafter, a preferred embodiment of the present invention will be described in detail with reference to the attached drawings. Note that in this description and the drawings, components having substantially the same function and structure are denoted by the same reference numerals, and duplicated descriptions are omitted.

[Overview of Operation Support Apparatus]

First, based on FIG. 1 to FIG. 3, an overview of an operation support apparatus 100 according to an embodiment of the present invention will be described. FIG. 1 is a block diagram illustrating an example of a structure of the operation support apparatus 100 according to this embodiment. FIG. 2 is an explanatory diagram conceptually illustrating an example of an adjusting method of an output timing of guidance by the operation support apparatus 100 according to this embodiment. FIG. 3 is an explanatory diagram illustrating an example of the relation between the output timing of guidance by the operation support apparatus 100 according to this embodiment and a correction amount of proficiency. Note that in the following description, it is assumed that the operation support apparatus 100 of this embodiment gives task guidance on equipment treatment, condition check, and the like for performing an operation stably with high quality in a plating line for sequentially annealing and plating a thin rolled steel plate.

The operation support apparatus 100 according to this embodiment is an apparatus which determines the proficiency of a worker from a task as a subject of outputting guidance and from a record of performing the task with respect to the timing of the task, and sets whether to output guidance or sets an output timing of guidance depending on the determined proficiency. The operation support apparatus 100 according to this embodiment evaluates a proficiency related to high-level operating know-how on an operation as well as planning and setup of operating tasks, and the like.

Such a proficiency is an index different from those evaluating the skill of a worker represented by a success rate of task, or the like. The present inventor focused attention on a point that the proficiency related to high-level operating know-how, such as task actions based on setup and planning of tasks appears in task timings, and have reached an idea to evaluate the proficiency from the difference in timing between a task reference timing and a task record. Specifically, a worker unskilled in a task is not able to perform the task efficiently, and thus even when guidance is given, it is difficult for him/her to perform the task immediately. On the other hand, a worker skilled in a task is able to set up the task by himself/herself, and hence is able to perform the task along an operation schedule even when guidance is not given. Note that in the following description, a worker skilled in a task will be referred to as a skilled person as necessary, and a worker unskilled in a task will be referred to as an unskilled person as necessary. By using the proficiency evaluating a task timing in this manner, guidance can be outputted to an unskilled person early corresponding to the proficiency, prompting to predict an operational mistake. On the other hand, to a skilled person, the output timing of guidance is delayed so that unnecessary guidance is not outputted when the task is completed before giving guidance, thereby allowing to carry out the operation by the setup of tasks assumed by the skilled person.

For example, as illustrated in FIG. 2, the output timing of guidance set according to a manufacturing schedule is defined as a guidance base time ($t_s$). When the proficiency of the worker is at an ordinary level, guidance is outputted at the guidance base time ($t_s$). For example, when the proficiency is represented in five steps of 1 to 5 such that a larger number indicates a more skilled person, the operation support apparatus 100 outputs guidance at the guidance base time ($t_s$) when the proficiency is 3.

On the other hand, when the worker is an unskilled person (that is, the proficiency<3), the operation support apparatus 100 controls the output timing of guidance according to the proficiency so that the guidance is outputted at a timing (guidance control time ($t_{c1}$)) earlier than the guidance base time ($t_s$) by a predetermined guidance timing control value (C1). Further, when the worker is a skilled person (that is, the proficiency>3), the operation support apparatus 100 controls the output timing of guidance according to the proficiency so that the guidance is outputted at a timing (guidance control time ($t_{c2}$)) later than the guidance base time ($t_s$) by a predetermined guidance timing control value (C2).

In this manner, the operation support apparatus 100 controls the output timing of guidance according to the proficiency, thereby providing support for the operation of the worker to allow proceeding with a task in a well-planned manner along the manufacturing schedule.

Further, the operation support apparatus 100 is structured to update the proficiency for determining the output timing of guidance so that the guidance can be outputted according to the latest proficiency of the worker. Update of the proficiency is performed by comparing an output plan of guidance with a task record. For example, when a worker skilled in a task with proficiency>3 carries out an operation, the operation support apparatus 100 sets the guidance control time ($t_{c1}$) by, as illustrated in FIG. 3, delaying the guidance base time ($t_s$) which is the output timing of guidance by a time corresponding to the proficiency of the worker. Then, the operation support apparatus 100 obtains a task record time ($t_{r1}$) at which the worker has actually performed the task, compares this time with the guidance control time ($t_{c1}$) set as the output plan of guidance, and determines whether this task is performed before the guidance control time ($t_{c1}$) or not.

At this time, when the task is performed before the guidance control time ($t_{c1}$), the operation support apparatus 100 corrects the proficiency of the worker to increase for the reason that the worker has performed the task on schedule without guidance. That is, in FIG. 3, when the task record time ($t_{r1}$) of a certain worker is obtained, this task record time ($t_{r1}$) is before the guidance control time ($t_{c1}$), and thus this worker has performed the task before guidance is outputted. In such case, the correction amount of the proficiency of this worker is a positive value (proficiency correction amount>0) in this embodiment. On the other hand, when the task is performed after the guidance control time ($t_{c1}$), the operation support apparatus 100 determines that the worker needs guidance to perform this task, and corrects the proficiency of the worker to decrease. That is, in FIG. 3, when a task record time ($t_{r2}$) of a certain worker is obtained, this task record time ($t_{r2}$) is after the guidance control time ($t_{c1}$), and thus this worker has performed the task after guidance is outputted. In such case, the correction amount of the proficiency of this worker is a negative value (proficiency correction amount<0) in this embodiment. Thus, the operation support apparatus 100 updates the proficiency depending on whether or not the worker has performed the task on schedule along the operation schedule. Accordingly, it is possible to output guidance at a timing corresponding to the proficiency of a worker.

Figure 13:
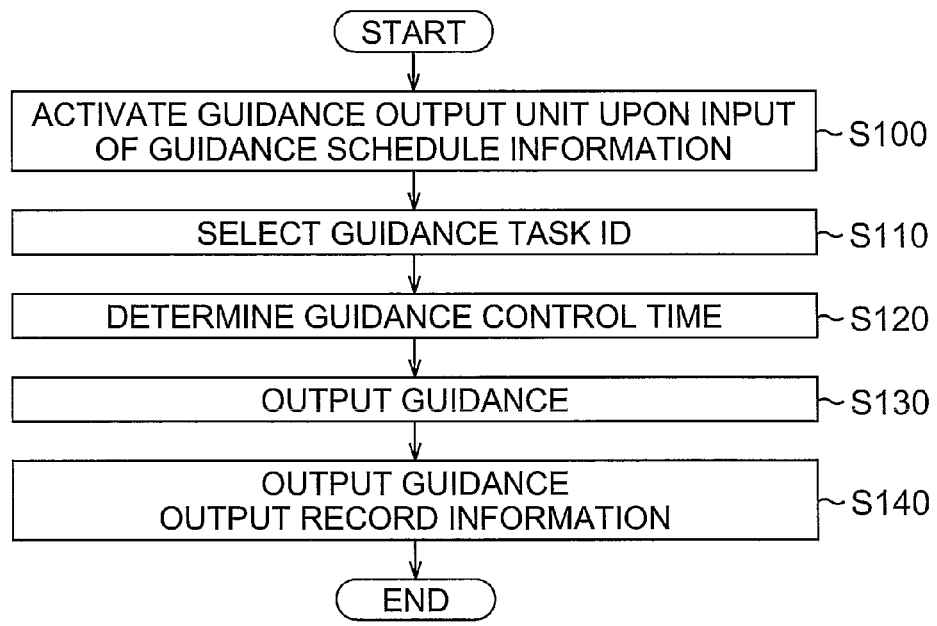
FIG. 13 is a flowchart illustrating an example of guidance output processing.
Figure 14:
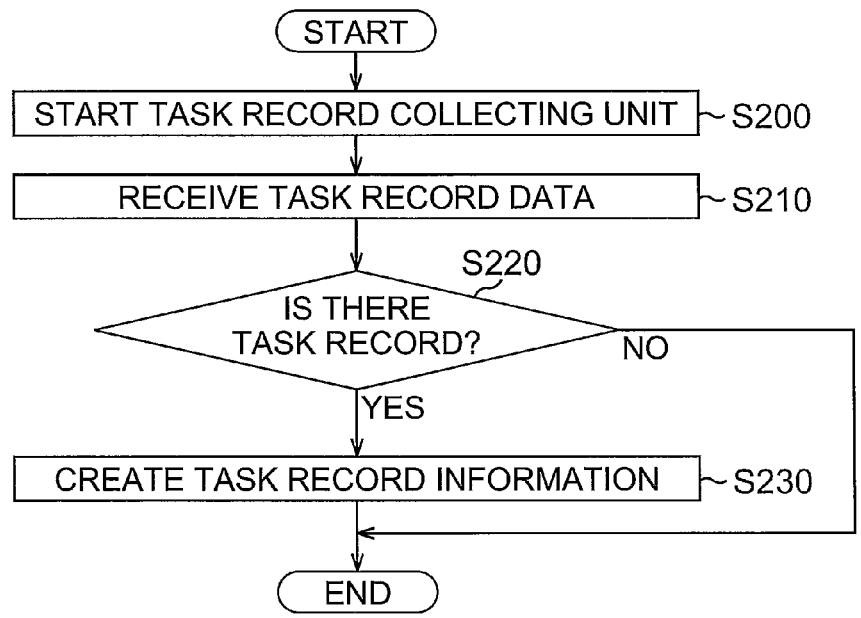
FIG. 14 is a flowchart illustrating an example of creation processing of task record information.
Figure 15:
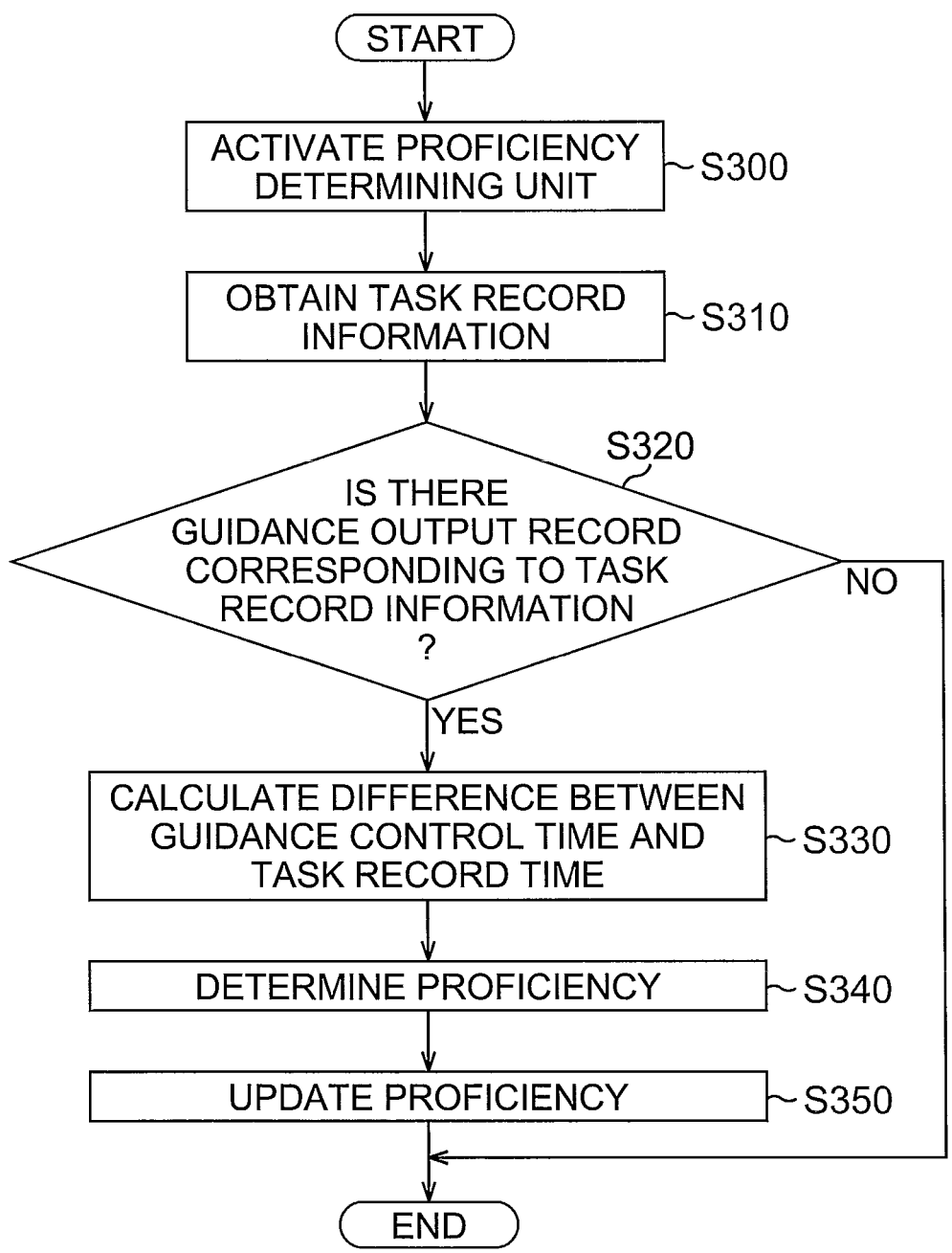
FIG. 15 is a flowchart illustrating an example of update processing of proficiency.

Hereinafter, based on FIG. 1 and FIG. 3 to FIG. 16, the structure of the operation support apparatus 100 according to this embodiment and functions thereof will be described in detail. Here, FIG. 3 to FIG. 12 and FIG. 16 are explanatory diagrams illustrating an example of a structure of information retained in the operation support apparatus 100 according to this embodiment and information transmitted/received therein. FIG. 13 is a flowchart illustrating an example of guidance output processing. FIG. 14 is a flowchart illustrating an example of creation processing of task record information. FIG. 15 is a flowchart illustrating an example of update processing of proficiency.

[Structure of the Operation Support Apparatus]

First, based on FIG. 1, the relation with external apparatuses which perform providing information used in the operation support apparatus 100 according to this embodiment, and the like, will be described. The operation support apparatus 100 is connected to a guidance schedule creating apparatus 210, a guidance output setting apparatus 220, and a task record determining apparatus 230 to be communicable with each other via a network. Note that the method of communication among these apparatuses is not particularly limited, and may either be wired communication or wireless communication. Further, at least one of the guidance schedule creating apparatus 210, the guidance output setting apparatus 220, and the task record determining apparatus 230 may be provided in the operation support apparatus 100.

The operation support apparatus 100 outputs guidance to a worker at an appropriate timing based on guidance schedule information created based on a manufacturing schedule and the proficiency of the worker. The guidance schedule information is created by the guidance schedule creating apparatus 210.

The guidance schedule creating apparatus 210 includes, for example, a guidance schedule unit 212, a guidance database (hereinafter referred to as "guidance DB") 214 storing information related to guidance to be notified to a worker corresponding to a task, and a manufacturing schedule 216. In the guidance DB 214, for example, information such as task ID specifying a task, guidance conditions for outputting guidance, and so on are stored in correlation with each other. According to the operation schedule 216 including information such as types of products, plate sizes, and so on, the guidance schedule unit 212 obtains the content of guidance to be notified to a worker and the output timing for this guidance from the guidance DB 214, and creates guidance schedule information 310. The guidance schedule creating apparatus 210 can be structured using, for example, a method disclosed in Japanese Laid-open Patent Publication No. 2009-48608, and items described in this publication may be included in the structure of the guidance schedule creating apparatus 210.

The guidance schedule creating apparatus 210 outputs the created guidance schedule information 310 to the guidance output setting apparatus 220. The guidance output setting apparatus 220 includes a timer register unit 222 setting an activation time for outputting the guidance schedule information 310 to a guidance output unit 110 of the operation support apparatus 100, and a timer 224 counting the activation time set by the timer register unit 222. The timer register unit 222 sets, for example, the activation time to activate the guidance output unit 110 of the operation support apparatus 100 at a predetermined time before the guidance base time at which guidance is outputted, which is contained in the guidance schedule information 310. When counting of the timer 224 reaches the activation time, the guidance output setting apparatus 220 outputs the guidance schedule information 310 to the guidance output unit 110. The guidance output setting apparatus 220 can be structured using, for example, a method disclosed in Japanese Laid-open Patent Publication No. 2006-127224, and items described in this publication may be included in the structure of the guidance output setting apparatus 220.

The guidance output unit 110 of the operation support apparatus 100 is activated upon input of the guidance schedule information 310 created by the guidance schedule creating apparatus 210 from the guidance output setting [[unit]] apparatus 220, and starts processing to output guidance to the worker.

Further, the operation support apparatus 100 updates the proficiency of the worker based on task record information of tasks actually performed by the worker and the output plan of guidance set by the guidance output unit 110. Task record information 340 is created from task record data obtained from the task record determining apparatus 230. The task record determining apparatus 230 includes an action determining unit 232 specifying a task content performed by the worker based on process data 234. The process data 234 contain, for example, operation information of manufacturing equipment such as tension record, action trace data such as walking trace of a worker, visual line trace data such as visual line movement to an instrument or screen, and so on.

The action determining unit 232 activates at constant cycles, specifies a task performed by the worker from the process data 234, and creates task record data. The task record data are outputted to a task record collecting unit 140 of the operation support apparatus 100 from the task record determining apparatus 230. Further, after the task record data are outputted from the task record determining apparatus 230 to a computer 235, the computer 235 may output the task record data to the task record collecting unit 140 of the operation support apparatus 100 in response to an output instruction inputted by the worker using a keyboard, a touch panel, a microphone, or the like. The operation support apparatus 100 creates the task record information 340 from the task record data. The task record information 340 is used for determining necessity of output of guidance and update processing of the proficiency. The task record determining apparatus 230 can be structured using, for example, a method disclosed in Japanese Laid-open Patent Publication No. 2009-265697, and items described in this publication may be included in the structure of the task record determining apparatus 230.

Next, the structure of the operation support apparatus 100 according to this embodiment will be described in detail. The operation support apparatus 100 includes, as illustrated in FIG. 1, the guidance output unit 110, a proficiency database (hereinafter referred to as "proficiency DB") 120, a guidance output control definition table 130, the task record collecting unit 140, a task determination definition table 150, a proficiency determining unit 160, a proficiency determination definition table 170, and a proficiency learning definition table 180.

The guidance output unit 110 controls the output timing of guidance based on the guidance schedule information 310 and the proficiency of the worker, and gives an output device an output instruction to output the guidance at this output timing. The output device is, as illustrated in FIG. 1 for example, a display 114 of a computer, a speaker 116, and/or the like. The guidance schedule information 310 is created by the guidance schedule creating apparatus 210 and inputted by the guidance output setting apparatus 220. The guidance schedule information 310 is structured to contain, as illustrated in FIG. 9 for example, a task ID 311, a guidance content 312, a guidance timing 313, and a guidance base time 314. The task ID 311 is an identifier for specifying a task and is a unique identifier to each task. The guidance content 312 is the content of guidance to be notified to the worker, and the guidance timing 313 indicates the timing (event) to output guidance. Further, the guidance base time 314 indicates an optimum time to output guidance on the operation schedule.

Upon reception of the guidance schedule information 310 from the guidance output setting apparatus 220, the guidance output unit 110 obtains the proficiency of a worker from the proficiency DB 120 using the worker ID of the worker recognized by an operator information recognition unit 112. The operator information recognition unit 112 recognizes the content of input information inputted by an operator and creates operator information 320, and outputs the operator information to the guidance output unit 110. The operator information 320 is structured to contain, as illustrated in FIG. 10 for example, a worker ID 321, a task start time 322, and a task finish time 323. Thus, a time zone in which the worker is performing a task can be recognized. In addition, while a task is continued, the task finish time 323 is not recorded yet because the task is not finished. When the proficiency of the worker is obtained, the guidance output unit 110 obtains the guidance timing control value corresponding to the proficiency from the guidance output control definition table 130, corrects the guidance base time which is an example of a base output timing, and determines a guidance control time (output time of guidance) which is an example of a control output timing.

The guidance output unit 110 refers to the task record information 340 created by the task record collecting unit 140 from the task record data collected by the task record determining apparatus 230, and checks whether or not a task for which guidance is scheduled is performed by the worker in question before the guidance control time is reached. When the task for which guidance is to be given is performed by this worker before the guidance control time is reached, the guidance output unit 110 does not output the guidance. On the other hand, when the task for which guidance is to be given is not performed by this worker before the guidance control time is reached, the guidance output unit 110 instructs the output device to output the guidance at the guidance control time $t_c$. As described above, the output device is achieved by, for example, the display 114 of a computer, the speaker 116, and/or the like. The guidance is outputted to the worker using the output device.

Further, the guidance output unit 110 creates guidance output record information 330 representing the content of guidance and an output record of guidance. The guidance output record information 330 is structured to contain, as illustrated in FIG. 11 for example, a worker ID 331, a task ID 332, a guidance base time 333, a guidance control time 334, and an actual output 335 indicating whether guidance is outputted or not. The guidance output unit 110 writes respectively the worker ID 331, the task ID 332, the guidance base time 333, and the guidance control time 334 in the guidance output record information 330 at a time point set based on the guidance schedule information 310 and the proficiency of the worker, and thereafter writes information of the actual output 335 when the guidance control time 334 has passed. In addition, all the information contained in the guidance output record information 330 may be written at once. When the guidance output record information 330 is created, the guidance output unit 110 outputs this guidance output record information 330 to the proficiency determining unit 160.

The proficiency DB 120 is a storage unit storing proficiencies of respective task contents for each worker. The proficiency DB 120 stores for each worker, as illustrated in FIG. 4 for example, a history of proficiencies related to each task ID, which is unique to a task content and is given for identifying the task content. In the proficiency DB 120, update of proficiencies is performed by the proficiency determining unit 160. The latest proficiency in the proficiency DB 120 is referred by the guidance output unit 110 and used for setting the guidance control time for outputting guidance. In addition, in the example illustrated in FIG. 4, the proficiencies are arranged in order of update time from the top.

The guidance output control definition table 130 is a storage unit storing guidance timing control values for adjusting guidance output times for each task ID. The guidance output control definition table 130 stores, as illustrated in FIG. 5 for example, guidance timing control values corresponding to proficiencies for each task ID. The guidance timing control values can be represented by, for example, a time to be added to or subtracted from the guidance base time. In the example illustrated in FIG. 5, units of time to be added to or subtracted from the guidance base time are represented in seconds.

For example, it is assumed that there are proficiencies represented in five steps of 1 to 5 such that a larger value indicates a more skilled person, while a smaller value indicates a more unskilled person. When an ordinary proficiency is 3, the guidance timing control value for an unskilled person (proficiency<3) is set so that the guidance is outputted at a time earlier than the guidance base time. On the other hand, the guidance timing control value for a skilled person (proficiency>3) is set so that the guidance is outputted at a time later than the guidance base time. The guidance timing control value can be set such that the higher or lower the proficiency, the larger the correction amount becomes. The guidance output control definition table 130 is referred by the guidance output unit 110 and is used for setting the guidance control time.

The task record collecting unit 140 obtains the task record data from the task record determining apparatus 230 and generates the task record information 340. The task record collecting unit 140 compares the task record data inputted from the action determining unit 232 of the task record determining apparatus 230 or the computer 235 with data stored in the task determination definition table 150, extracts the task record data coinciding with the data stored in the task determination definition table 150, and generates the task record information 340. The task record information 340 is structured to contain, as illustrated in FIG. 12 for example, a worker ID 341, a time 342, and a task ID 343. The task record collecting unit 140 outputs the generated task record information 340 to the guidance output unit 110 and the proficiency determining unit 160.

The task determination definition table 150 is a storage unit storing task contents. The task determination definition table 150 stores, as illustrated in FIG. 6 for example, a task ID 151, a data item 152 indicating the category of a task content, a task content 153 to be performed, a method of performing the task (input source of input information to be inputted for performing the task) 154, and a record valid period 155 indicating a measure of intervals of performing the task in correlation with each other. The information stored in the task determination definition table 150 is referred by the guidance output unit 110 and used for checking the record of guidance, and is also referred by the task record collecting unit 140 and used for generating the task record information.

The proficiency determining unit 160 determines a proficiency of the worker with respect to a task from the guidance output record information 330 and the task record information 340. The proficiency determining unit 160 takes in a task record which is within the record valid period and also is unprocessed from the task record information 340, and extracts the guidance output record corresponding to this task record from the guidance output record information 330. Then, when the guidance output record corresponding to the task record is extracted, the proficiency determining unit 160 calculates the difference between the guidance output time and the task record time from these information, and calculates a correction amount of the proficiency. The correction amount of the proficiency is calculated using the proficiency determination definition table 170. Once the correction amount of the proficiency is calculated, the proficiency determining unit 160 refers to the proficiency learning definition table 180, takes out a learning method and a parameter corresponding to the proficiency of the task to be updated, and calculates the latest proficiency. Then the proficiency determining unit 160 records the calculated latest proficiency in the proficiency DB 120.

The proficiency determination definition table 170 is a storage unit storing correction amounts of the proficiency for each task ID. The proficiency determination definition table 170 stores, as illustrated in FIG. 7 for example, proficiency correction amounts corresponding to a difference between the guidance output time and the task record time for each task ID. For example, regarding a task ID "0001", a proficiency correction amount of 0 (zero) is set when the difference between the guidance output time and the task record time is ±10 seconds or less, and the proficiency is not changed. Further, when the difference between the guidance output time and the task record time is more than 10 seconds but equal to or less than 20 seconds, that is, when the task is performed later than the guidance control time, it is considered that the worker is unskilled in this task. Accordingly, the proficiency correction amount is defined to add −1 to the current proficiency so as to decrease the proficiency.

On the other hand, when the difference between the guidance output time and the task record time is less than −10 seconds but not less than −20 seconds, that is, when the task is performed earlier than the guidance control time, it is considered that the worker is skilled in this task. Accordingly, the proficiency correction amount is defined to add 1 to the current proficiency so as to increase the proficiency. The proficiency correction amount can be set in consideration of easiness of the task and required accuracy of the task, a time required for the task, and the like. Accordingly, a different setting can be made for each task. As described above, in the example illustrated in FIG. 7, the difference between the guidance output time and the task record time is represented in units of seconds. In the example illustrated in FIG. 7, when the value of the proficiency correction amount is 0 (zero), this value indicates that the worker is ordinarily skilled in the task. Further, the larger the value from 0, the more the worker is skilled in the task, and the smaller the value from 0, the more the worker is unskilled in the task.

The proficiency learning definition table 180 is a storage unit storing a learning method for updating the current proficiency for each task ID. The proficiency learning definition table 180 can be structured to retain, as illustrated in FIG. 8 for example, a learning method for updating the proficiency and a parameter used for this method for each task ID. It is possible to store plural parameters in the proficiency learning definition table 180 of FIG. 8, but a necessary parameter for learning may be stored at a minimum.

As the learning method for updating the proficiency, for example, exponential smoothing method, moving average method, or the like can be used. In the exponential smoothing method, a new data value is influenced by values in the past, and data of proficiencies included in the time series are weighted so that the influence gets stronger as it is closer to the present time and gets weaker as it goes back further to the past, for calculating a predicted value of data of the new proficiency. The moving average method is a method of smoothing out time series data. When such a method is performed, a finally obtained proficiency when the moving average is calculated is stored in the proficiency DB 120 illustrated in FIG. 4. On the other hand, a value for calculating the moving average is a history of values (corrected proficiencies prior to moving averaging) resulting from adding a value of the proficiency correction amount to a proficiency prior to calculation of the moving average, the proficiency obtained just before the calculation is performed. Therefore, when such a method is performed, for example, the history of the corrected proficiencies prior to moving averaging is stored in the proficiency DB 120 for each worker and for each task ID together with a history of proficiencies obtained finally. For example, update of the proficiency of the task ID "0004" in FIG. 8 is performed by moving averaging the corrected proficiencies prior to moving averaging of past 10 times including the present time due to the parameter being set to 10. In addition, the history of corrected proficiencies prior to moving averaging for each worker and for each task ID may be stored in a database separated from the proficiency DB 120. In the case where the history of corrected proficiencies prior to moving averaging is stored in the proficiency DB 120 together with the history of finally obtained proficiencies, for example, each of input fields of proficiencies illustrated in FIG. 4 may be subdivided into an input field of a final proficiency (proficiency illustrated in FIG. 4) and input fields of corrected proficiencies prior to moving averaging. On the other hand, when the history of corrected proficiencies prior to moving averaging is stored in a database separated from the proficiency DB 120, this database may be structured such that, for example, corrected proficiencies prior to moving averaging are inputted to the input fields of proficiencies of FIG. 4 instead of final proficiencies.

The structure of the operation support apparatus 100 according to this embodiment has been described above. In addition, the proficiency DB 120, the guidance output control definition table 130, the task determination definition table 150, the proficiency determination definition table 170, and the proficiency learning definition table 180 may be stored in respective independent storage units, or a plurality of them may be stored in one storage unit. Further, even when at least one of them is stored in a storage unit (device) independent from other parts forming the operation support apparatus 100, this storage unit is of course structured to function as a part of the operation support apparatus 100.

Further, the output devices 114, 116, timer 161, and computers 162, 235 need not to be included in the operation support apparatus 100.

[Guidance Output in Consideration of Proficiencies by the Operation Support Apparatus]

Next, an example of a method for performing guidance output in consideration of proficiencies using the operation support apparatus 100 according to this embodiment will be described together with specific examples.

(1. Guidance Output Processing)

First, an example of guidance output processing by the operation support apparatus 100 according to this embodiment will be described based on FIG. 13. As illustrated in FIG. 13, the guidance output processing is started as the guidance output unit 110 is activated upon input of the guidance schedule information 310 illustrate in FIG. 9 (step S100). Upon reception of the guidance schedule information 310 created by the guidance schedule creating apparatus 210, the guidance output setting apparatus 220 sets, by the timer register unit 222, the timing to output the guidance schedule information 310 to the guidance output unit 100, that is, the activation time to activate the guidance output unit 110. The activation time can be set so that the guidance output unit 110 is activated, for example, earlier than the guidance base time 314 included in the guidance schedule information 310 by a predetermined time TB (for example, TB=120 seconds).

In case that the activation time is set by the timer register unit 222, the timer 224 is activated, and counting until the activation time of the guidance output unit 110 is started. Then, as counting of the timer 224 reaches the activation time, the guidance output setting apparatus 220 outputs the guidance schedule information 310 to the guidance output unit 110.

The activated guidance output unit 110 selects the task ID of a task for which guidance is to be given from the guidance schedule information 310 (step S110). To describe specifically, the guidance output unit 110 compares the activation time with the guidance base time 314 of the guidance schedule information 310, and specifies the task ID of the task for which guidance is to be given. For example, in case that the activation time of the guidance output unit 110 is set to 120 seconds before the guidance base time 314 and if the activation time is "2009.08.19 13:21:40", the guidance base time is estimated as "2009.08.19 13:23:40". The guidance output unit 110 specifies the task ID of the task for which the guidance base time is "2009.08.19 13:23:40" from the guidance schedule information 310. For example, in the example of FIG. 9, the guidance base time of the task ID "0001" is "2009.08.19 13:23:40", and thus the guidance output unit 110 proceeds with guidance output processing so as to give guidance of the task ID "0001".

Next, the guidance output unit 110 determines the guidance control time (step S120). To describe specifically, the guidance output unit 110 first specifies the operator in operation from the operator information 320 as illustrated in FIG. 10 inputted from the operator information recognition unit 112. For example, when the activation time of the guidance output unit 110 in step S100 is "2009.08.19 13:21:40" and if the operator information 320 illustrated in FIG. 10 is obtained, the guidance output unit 110 obtains the worker ID 321 specifying the worker in operation at the activation time of the guidance output unit 110. From FIG. 10, it can be seen that the worker in operation at the point of the activation time "2009.08.19 13:21:40" is the worker with worker ID "A". That is, the target for notifying the guidance of the task ID "0001" is the worker with worker ID "A".

Once the worker ID is obtained, the guidance output unit 110 refers to the proficiency DB 120 to obtain the current (latest) proficiency of the worker who is the target for notifying the guidance. The proficiency DB 120 retains, as illustrated in FIG. 4 for example, the histories of proficiencies of each worker for respective task ID. For example, when the guidance of the task ID "0001" is performed for the worker with worker ID "A", the guidance output unit 110 refers to the proficiency DB 120 and obtains the latest proficiency "3".

Moreover, the guidance output unit 110 determines the guidance control time at which the guidance is to be actually outputted based on the current proficiency obtained from the proficiency DB 120 with respect to this task of the worker, who is the target for notifying the guidance. The guidance control time is a time resulting from adjusting the guidance base time with the guidance timing control value corresponding to the proficiency, and is defined by the sum of the guidance base time and the guidance timing control value. The guidance timing control value can be obtained by referring to the guidance output control definition table 130 as illustrated in FIG. 5.

For example, when giving the guidance of the task ID "0001" to the worker having the proficiency "3", the guidance output unit 110 obtains the guidance timing control value "0" from the guidance output control definition table 130 illustrated in FIG. 5 for example. Then, the guidance output unit 110 adds the guidance timing control value "0" to the guidance base time "2009.08.19 13:23:40", and sets a guidance control time "2009.08.19 13:23:40".

In addition, when giving guidance to a worker with a low proficiency, the guidance timing control value is set to make the guidance control time "2009.08.19 13:23:40" become earlier, thereby giving guidance early to an unskilled person and prompting to predict an operational mistake. On the other hand, when giving guidance to a worker with a high proficiency, the guidance timing control value is set to make the guidance control time "2009.08.19 13:23:40" become later. Accordingly, unnecessary guidance is not outputted to a skilled person, allowing the worker to perform the task according to a task procedure, which is set up already by the worker.

Once the guidance control time is set, the guidance output unit 110 writes guidance output information to the guidance output record information 330. As the guidance output information, as illustrated in FIG. 11 for example, the worker ID 331, the task ID 332, the guidance base time 333, and the guidance control time 334 are written. For example, the guidance output unit 110 writes the guidance output information such that guidance of the task ID "0001" is outputted to the worker of the worker ID "A" at the guidance control time "2009.08.19 13:23:40" in the guidance output record information 330.

Thereafter, the guidance output unit 110 performs output of guidance based on the set guidance output information and the task record information 340 as illustrated in FIG. 12 (step S130). To describe specifically, first, the guidance output unit 110 refers to the task record information 340 inputted by the task record collecting unit 140 and checks whether the task to be notified by the guidance to be outputted is already performed or not. When the task to be notified by this guidance has been performed before the guidance control time, the guidance output unit 110 does not output the guidance, and records that the guidance is not outputted in the guidance output record information 330. On the other hand, when there is no record of performing the task until the guidance control time 334 in the task record information 340, the guidance output unit 110 determines that it is necessary to output guidance, records that guidance is outputted in the guidance output record information 330, and outputs predetermined guidance at the guidance control time 334.

For example, the case where guidance of the task ID "0001" is outputted to the worker with worker ID "A" of FIG. 11 is considered. At this time, it is assumed that the time of performing the task ID "0001" in the task record information 340 is Ts001. The guidance output unit 110 monitors from the task record information 340 whether the worker with worker ID "A" has performed the task of the task ID "0001" or not in a period from the time prior to the guidance control time 334 by the record valid period 155 to the guidance control time 334 (that is, "guidance control time−record valid period"≦Ts001≦"guidance control time"). The record valid period 155 can be obtained from the task determination definition table 150 as illustrated in FIG. 6. The guidance output unit 110 monitors the task record information 340 until the guidance control time 334 and records "1" indicating that guidance is outputted in the column of the actual output 335 of the guidance output record information 330 when there is not task record. Then, the guidance output unit 110 instructs the output devices 114 and 116 to output guidance having a guidance content "please stop cleaning liquid" of the guidance schedule information 310 at the guidance control time 334. As described above, in this embodiment, when a task identified by a task ID 151 is performed further before the time prior to the guidance control time 334 by the record valid period 155, it is structured to handle this as a task which is not an appropriate task. As described above, the record valid period 155 indicates a measure of intervals of performing a task. For example, to a task which is performed with a relatively high frequency, a relatively small value is set in advance as the record valid period 155, and to a task which is performed with a relatively low frequency, a relatively large value is set in advance as the record valid period 155.

In addition, in the above-described example, in FIG. 12 the worker with worker ID "A" has performed the task of the task ID "0001" at the time "2009.08.19 13:23:55". Therefore, guidance is needed for the worker with worker ID "A" to perform the task of the task ID "0001" on schedule. Thus, by notifying guidance at the guidance control time 334, it is possible to call the worker's attention to perform the task along the schedule. Further, when the worker has performed the task before the guidance control time 334, the guidance output unit 110 does not output guidance and records "0" indicating that no guidance is outputted in the column of the actual output 335 of the guidance output record information 330.

When the guidance control time 334 has passed, the guidance output unit 110 outputs the created guidance output record information 330 to the proficiency determining unit 160 to finish the processing (step S140). In this manner, the guidance output unit 110 corrects the guidance base time 314 corresponding to the proficiency of the worker and sets the guidance control time 334 based on the guidance schedule information and the proficiency of the worker. Accordingly, guidance can be outputted at an appropriate timing corresponding to the proficiency of the worker.

(2. Creation Processing of the Task Record Information)

Next, an example of creation processing of task record information by the operation support apparatus 100 according to this embodiment will be described based on FIG. 14. As illustrated in FIG. 14, the task record information 340 indicating the task contents which a worker has actually performed is created by the task record collecting unit 140. The task record collecting unit 140 is activated (step S200) based on a determination result of the action determining unit 232 of the task record determining apparatus 230 or on input information inputted via the computer 235 by an operator based on a determination result from the action determining unit 232. Once activated, the task record collecting unit 140 receives the task record data from the task record determining apparatus 230 or the computer 235 (step S210).

Next, the task record collecting unit 140 refers to the task determination definition table 150 as illustrated in FIG. 6 and determines the presence of data coinciding with the received task record data to check the presence of a task record (step S220). In the task determination definition table 150, task guidance performed on the plating line is recorded. The task record collecting unit 140 compares data items of the task record data and the contents thereof with data items 152 of the task determination definition table 150 and the contents 153 thereof, and extracts task record data coinciding in item and content.

Regarding the task record data coinciding with the data items 152 of the task determination definition table 150 and the contents 153 thereof, there is created, as a task record, the task record information 340 made up of the task ID 151 of the task determination definition table 150 and the worker ID of the worker in operation at the current time, and the current time (step S230). From the task record information 340, as illustrated in FIG. 12, it is possible to recognize an actually performed task such that the worker with worker ID "A" has performed the task of the task ID "0001" at the time "2009.08.19 13:23:55". The task record collecting unit 140 outputs the created task record information 340 to the guidance output unit 110 and the proficiency determining unit 160.

On the other hand, in step S220, regarding task record data in which there is no data coinciding with the task determination definition table 150, the task record collecting unit 140 does not include the task record data in the task record information 340, and finishes the processing. The creation processing of the task record information has been described above. In this manner, the task record information 340 used for the guidance output processing and proficiency determination processing can be created.

(3. Proficiency Determination Processing)

Next, an example of proficiency determination processing by the operation support apparatus 100 according to this embodiment will be described based on FIG. 15. The proficiency determination processing with respect to a worker is performed by the proficiency determining unit 160. The proficiency determination processing is started upon activation of the proficiency determining unit 160 (step S300). The proficiency determining unit 160 can be activated by a timer 161 at constant cycles registered in advance when the operation support apparatus 100 is activated, or by input of calculation request information of a proficiency by the computer 162.

Once activated, the proficiency determining unit 160 obtains the task record information 340 inputted from the task record collecting unit 140 (step S310). From the task record information 340, the proficiency determining unit 160 takes in task record information 340 which occurred in the period from the previous activation time to the latest activation time of the proficiency determining unit 160. The task record time of the task record information 340 taken in at this time is denoted as TxxxxR. Note that "xxxx" is the number of the corresponding task ID, and the same applies below. For example, in the task record information 340 illustrated in FIG. 12, in case that the latest activation time (K-th activation) is "2009.08.19 13:24:00" and the previous activation time ((K−1)-th activation) is "2009.08.19 13:23:30", the record therebetween is the task of the task ID "0001" performed at the time "2009.08.19 13:23:55". This time is denoted as T0001R.

Next, the proficiency determining unit 160 determines the presence of guidance output record corresponding to the task record information 340 (step S320). In step S320, the proficiency determining unit 160 checks whether the guidance output record information 330 of the same task ID as the task ID of the task record information 340 obtained in step S310 exists or not before the current time. Then, when the guidance output record information 330 of the same task ID as the task ID of the task record information 340 exists before the current time, the proficiency determining unit 160 denotes the guidance control time 334 of this guidance output record information 330 as TxxxxC, deletes this guidance output record information 330, and thereafter performs processing of step S330.

For example, the guidance output record information 330 of FIG. 11 contains information of the same task ID as the task ID "0001" of the task record information 340 illustrated in FIG. 12. At this time, the proficiency determining unit 160 denotes the guidance control time "2009.08.19 13:23:40" of the guidance output record information 330 as T0001C, and deletes this guidance output record information 330. In addition, if a plurality of guidance output record information are extracted, the oldest information is employed. Further, when the guidance output record information 330 corresponding to the task record information 340 does not exist, this processing is finished.

When the guidance output record information 330 corresponding to the task record information 340 exists, the proficiency determining unit 160 calculates the difference $\Delta T$ between the task record time 342 of the task record information 340 and the guidance control time 334 of the guidance output record information 330 (step S330). For example, when the task record time T0001R of the task record information 340 is "2009.08.19 13:23:55" and the guidance control time T0001C of the guidance output record information 330 is "2009.08.19 13:23:40", the difference $\Delta T0001$ therebetween is as follows.

$$\Delta T0001 = T0001R - T0001C$$
$$= \text{``}2009.08.19\ 13{:}23{:}55\text{''} - \text{``}2009.08.19\ 13{:}23{:}40\text{''}$$
$$= 15\ \text{[seconds]}$$

Thus, it can be seen that the task is performed at 15 seconds after output of the guidance.

Thereafter, the proficiency determining unit 160 refers to the proficiency determination definition table 170 and calculates a correction amount of the proficiency of the worker who has performed the task from the difference ΔT between the task record time 342 of the task record information 340 and the guidance control time 334 of the guidance output record information 330 (step S340). For example, it is assumed that, for the task ID "0001" of the worker ID "A", the difference ΔT0001 between the task record time of the task record information 340 and the guidance control time of the guidance output record information 330 is 15 seconds as calculated in step S330. At this time, the proficiency determining unit 160 refers to the proficiency determination definition table 170 having the structure illustrated in FIG. 7 for example, and obtains a proficiency correction amount. In this example, the proficiency correction amount becomes −1 due to the task ID "0001" and the difference ΔT0001=15. This proficiency correction amount is denoted as E0001r.

Then, the proficiency determining unit 160 performs learning and update of the proficiency (step S350). First, the proficiency determining unit 160 obtains the current proficiency of the task in question of the worker from the proficiency DB 120. For example, the current proficiency of the task ID "0001" of the worker ID "A" is "3" from FIG. 4. This proficiency is denoted as E0001k. Next, the proficiency determining unit 160 refers to the proficiency learning definition table 180 and obtains the learning method of the proficiency and the parameter thereof corresponding to the task ID. For example, when the proficiency learning definition table 180 is set as illustrated in FIG. 8, it can be seen that the learning method of the proficiency of the task ID "0001" is the exponential smoothing method, and the parameter of the exponential smoothing function is 0.7. The parameter is an update gain with respect to the correction amount of the proficiency of this time.

Thus, the proficiency determining unit 160 calculates a new proficiency E0001n by, for example, the following exponential smoothing function.

$$E0001n = E0001k + 0.7 \times E0001r$$
$$= 2.3$$
$$\doteqdot 2$$

In addition, the proficiency is an integer in this embodiment, and thus for example any number below decimal point is rounded off to make an integer value.

The proficiency determining unit 160 records the proficiency of the task ID "0001" calculated thus as the latest proficiency in the proficiency DB 120. At this time, the past proficiency recorded already in the proficiency DB 120 is shifted by one in a direction toward an old side on the time axis. For example, the proficiency of the task ID "0001" of the worker ID "A" in the proficiency DB 120 is updated to a proficiency "2" as illustrated in FIG. 16. In this example, since the proficiency has become lower than before the update, guidance at the time of performing the task ID "0001" to the worker with worker ID "A" of the next time is outputted slightly earlier than the guidance base time (10 seconds before in the example of FIG. 5). Accordingly, announcement of hazard prediction or the like can be performed for an unskilled person.

Here, it can be seen that the proficiency of the task ID "0003" for the worker with worker ID "B" increases from "3" to "4" when the guidance output processing, the creation processing of the task record information, and the proficiency determination processing described above are performed. In this case, next guidance for the worker with worker ID "B" when the task of the task ID "0003" is performed is outputted slightly later than the guidance base time (at 30 seconds after the guidance base time in the example of FIG. 5). In this manner, for a person skilled in the task, there is performed an operation such that the output timing of guidance is delayed, and whether or not he/she performs the task without output of the guidance is checked. When the skilled person keeps performing the task before the guidance which is outputted later than the guidance base time, the operation support apparatus 100 assumes that the worker has completely mastered this task, and output of the guidance is substantially excluded. Thus, adverse effect of unnecessary guidance can be eliminated.

The guidance output processing, the creation processing of the task record information, and the proficiency determination processing using the operation support apparatus 100 according to this embodiment have been described above. The operation support apparatus 100 is able to output guidance corresponding to the proficiency of a worker by performing these processing repeatedly.

To summarize, when the skill of the worker is used as the proficiency as is conventionally done, the result of a task has to be evaluated, and thus it is necessary to correct the proficiency off-line. On the other hand, in this embodiment, the proficiency in each task of a worker can be corrected automatically. Further, in this embodiment, guidance is given to an unskilled person earlier than the guidance base time 314, and guidance is given to a skilled person later than the guidance base time 314. Thus, guidance can be outputted at an appropriate timing for both the unskilled person and the skilled person. Moreover, it is structured not to give guidance when the task is finished already at the timing of outputting the guidance, thereby preventing output of unnecessary guidance.

[Hardware Structure Example]

Figure 17:
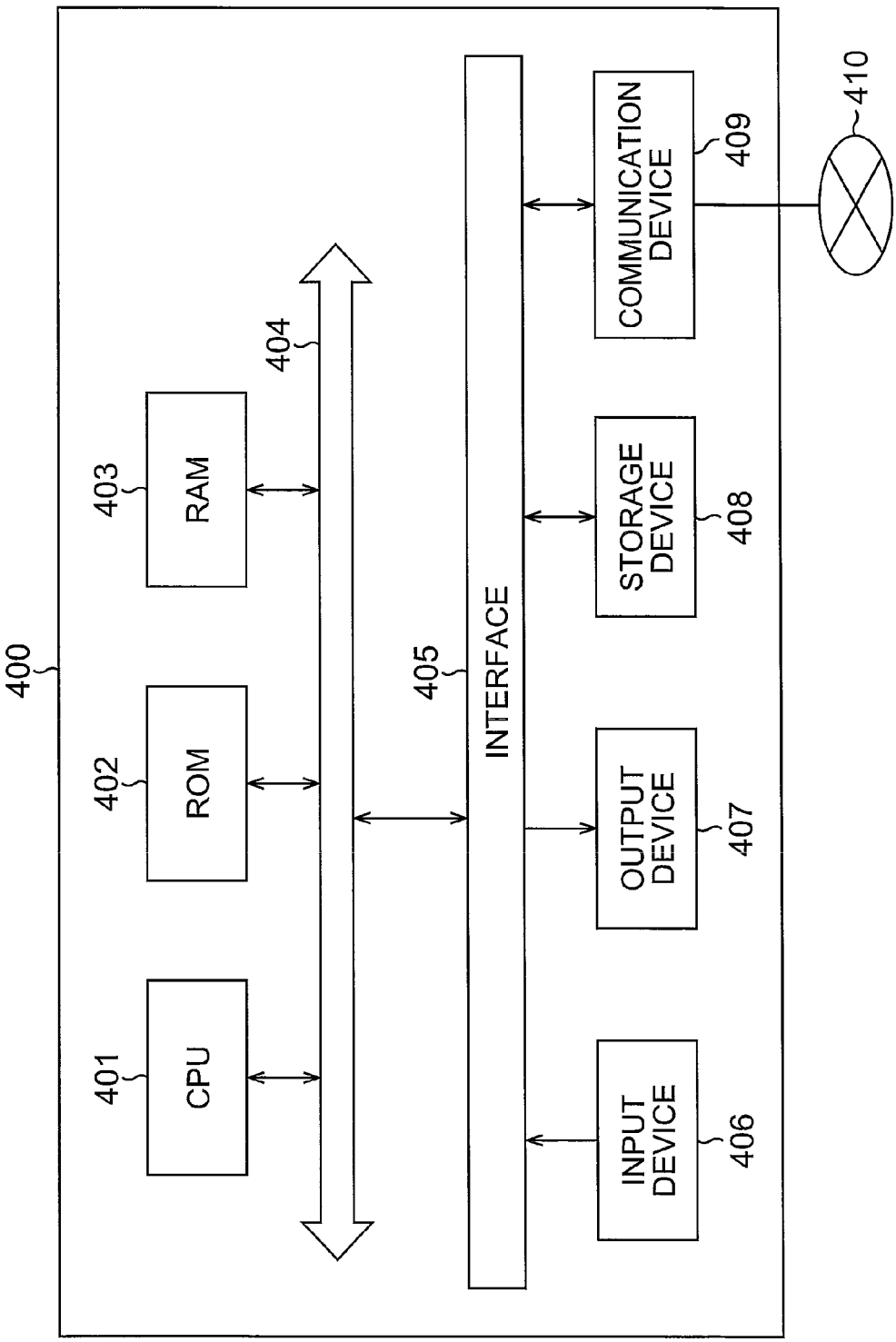
FIG. 17 is a hardware configuration illustrating an example of a structure of the operation support apparatus according to this embodiment.

The operation support apparatus 100 according to the above-described embodiment can be achieved by an information processing apparatus 400 such as a personal computer. Such an information processing apparatus 400 includes, as illustrated in FIG. 17 for example, a CPU (Central Processing Unit) 401, a ROM (Read Only Memory) 402, a RAM (Random Access Memory) 403, a bus 404, an interface 405, an input device 406, an output device 407, a storage device 408, and a communication device 409.

The CPU 401 functions as arithmetic processing device and as control device, and controls the overall operation of the operation support apparatus 100 according to various programs. Further, the CPU 401 may be a microprocessor. The ROM 402 stores programs, operation parameters, and so on used by the CPU 401. The RAM 403 temporarily stores programs used when the CPU 401 is executed, parameters changing through this execution, and so on. These components are connected to each other via the bus 404. The bus 404 is connected to an interface 405 which connects the input device 406, the output device 407, the storage device 408, and the communication device 409 with each other.

The input device 406 is made up of an input unit for a user to input information, such as a mouse, a keyboard, a touch panel, a button, a microphone, a switch, and a lever and an input control circuit generating an input signal based on an input by the user and outputting the input signal to the CPU 401. By manipulating this input device 406, an operator of the operation support apparatus 100 can input various data or instruct a processing operation to the operation support apparatus 100.

The output device 407 includes, for example, a display device such as a CRT (Cathode Ray Tube) display device, a liquid crystal display (LCD) device, an OLED (Organic Light Emitting Diode) device, and a lamp. Further, the output device 407 includes an audio output device such as a speaker and a headphone.

The storage device 408 is for storing data which is structured as an example of the storage unit of the operation support apparatus 100, and includes an HDD (Hard Disk Drive) for example. The storage device 408 drives, for example, a hard disk to store programs executed by the CPU 401 and various data. Further, the communication device 409 is, for example, a communication interface including a communication device and so on for connection to a communication network 410. As the communication device 409, for example, a communication device corresponding to a wireless LAN (Local Area Network), a communication device corresponding to a wireless USB, a communication device performing wired communication, and/or the like can be used.

In addition, such an information processing apparatus 400 may include, for example, a reader/writer for storage media included in the information processing apparatus 400 or attached externally thereto. The reader/writer for storage media reads information recorded in a removable recording medium such as a magnetic disk, an optical disk, a magnetic optical disk, or a semiconductor memory which is mounted, and outputs the read information to the RAM 403. Further, the information processing apparatus 400 can include an interface connected to an external device, and can be used as, for example, a connecting port to an external device capable of transmitting data through USB (Universal Serial Bus) or the like.

Here, the operation support apparatus 100 according to this embodiment can be achieved by one information processing apparatus 400, or achieved by a plurality of information processing apparatuses 400. When the operation support apparatus 100 is achieved by a plurality of information processing apparatuses 400, the above-described processing is performed in a manner dispersed in the plurality of information processing apparatuses 400.

The preferred embodiment of the present invention has been described in detail above with reference to the drawings, but the present invention is not limited to such as embodiment. It is apparent that a person having common knowledge in the technical field to which the present invention belongs is able to devise various variation or modification examples within the range of technical ideas described in the claims, and it should be understood that such examples belong to the technical scope of the present invention as a matter of course.

For example, in this embodiment, the guidance output unit 110 specifies the worker in operation using the operator information 320 identified by the operator information recognition unit 112. However, the method for specifying the worker in operation is not limited to such an example. For example, identification with an IC card or identification through biometrics authentication may be performed to specify the worker in operation.

Further, in this embodiment, an example of setting a proficiency indicated in five steps is described, but the present invention is not limited to such an example. An index indicating operation know-how by arbitrary expression may be used.

Moreover, in this embodiment, guidance is given earlier than the guidance base time 314 to an unskilled person, and guidance is given later than the guidance base time 314 to a skilled person. However, guidance need not be always given in this manner. For example, guidance may be given earlier than the guidance base time 314 to a skilled person depending on the content of guidance. In this case, the value of the proficiency correction amount with respect to skilled persons in the guidance output control definition table 130 may be a negative value. That is, by adjusting the value of the proficiency correction amount in the guidance output control definition table 130, the timing to output guidance can be determined appropriately corresponding to the proficiency of the worker.

Further, the proficiency DB 120 as an example of a proficiency storage unit need not necessary be a database as long as it stores histories of proficiencies for respective task ID and respective workers.

Further, in this embodiment, as an example of an operation of manufacturing equipment, an example of outputting guidance related to an operation in a plating line is explained. However, by performing processing similar to the above-described processing using data which are appropriate for operation of the manufacturing equipment of interest, guidance related to an operation of manufacturing equipment other than those in the plating line may be outputted according to the processing described in this embodiment. Moreover, besides the guidance related to an operation of manufacturing equipment, any kind of guidance can be outputted according to the processing described in this embodiment as long as it is related to an operation carried out by a worker according to a workflow in which timings to execute respective tasks are determined in advance. Examples of such an operation include repair tasks, maintenance tasks, and the like.

The embodiment of the present invention as described above can be achieved by a computer executing a program. Further, means for supplying the program to a computer, for example, a computer readable recording medium such as a CD-ROM recording such a program or a transmission medium transmitting such a program can be applied as an embodiment of the present invention. Moreover, a program product such as a computer readable recording medium recording the above-described program may be applied as an embodiment of the present invention. The above-described program, computer readable recording medium, transmission medium, and program product are included in the scope of the present invention.

INDUSTRIAL APPLICABILITY

The present invention is useful for giving guidance to a worker in operation.

The invention claimed is:

1. An operation support apparatus performing processing using a computer for giving guidance leading to the start of tasks to a worker carrying out an operation in which execution timings for respective tasks are determined in advance, the apparatus comprising:
a proficiency storage unit of a computer memory storing, for each worker, proficiencies with respect to tasks performed in the operation and determined corresponding to a difference between an output time of guidance related to a task and a task record time for the task;

a guidance output unit of a computer processor obtaining a proficiency of a worker with respect to a task to be performed from the proficiency storage unit, correcting corresponding to the proficiency of the worker a guidance base time determined based on an operation schedule and determining a guidance control time corresponding to the proficiency of the worker, and instructing an output device to output the guidance to the worker at the guidance control time;

a task record collecting unit of a computer processor creating task record information containing a task content and a task time of a task performed by the worker; and a proficiency determining unit of a computer processor correcting the proficiency of the worker with respect to the task based on the guidance control time of the guidance and the task time contained in the task record information, and updating the proficiency of the worker with respect to the task stored in the proficiency storage unit, wherein the guidance output unit obtains a latest proficiency from the proficiency storage unit when the proficiency of the worker with respect to the task to be performed is updated by the proficiency determining unit.

2. The operation support apparatus according to claim 1, wherein the guidance output unit sets the guidance control time at a point later than the guidance base time for guidance of a task for which a corresponding proficiency among the proficiencies is high, and sets the guidance control time at a point earlier than the guidance base time for guidance of a task for which a corresponding proficiency among the proficiencies is low.

3. The operation support apparatus according to claim 2, wherein when a task record indicating that the task is performed by the worker at a point earlier than the guidance control time is detected from the task record information, the guidance output unit does not output guidance of the task.

4. The operation support apparatus according to claim 1, further comprising a worker identifying unit identifying a worker in operation and outputting a worker ID specifying the identified worker to the guidance output unit, wherein the guidance output unit obtains a proficiency of the worker with respect to a task to be performed from the proficiency storage unit based on a task ID specifying a task content to be notified to the worker by guidance outputted at the guidance base time and the worker ID inputted from the worker identifying unit.

5. The operation support apparatus according to claim 4, wherein the proficiency determining unit increases the proficiency of the worker with respect to the task when the task time is earlier than the guidance control time, and decreases the proficiency of the worker with respect to the task when the task time is later than the guidance control time.

6. The operation support apparatus according to claim 5, wherein the proficiency determining unit calculates a difference between the guidance control time and the task time, and determines a size of a correction amount of the proficiency corresponding to a size of the difference.

7. The operation support apparatus according to claim 6, wherein the proficiency determining unit calculates the proficiency after the update by an exponential smoothing method based on a correction amount of the proficiency and a proficiency already obtained before being corrected with the correction amount of the proficiency or by a moving average method based on a history of corrected proficiencies prior to moving averaging, which are values resulting from correcting a proficiency prior to calculation of a moving average, the proficiency obtained just before the calculation is performed, by a correction amount of the proficiency.

8. An operation support method performing processing using a computer for giving guidance leading to the start of tasks to a worker carrying out an operation in which execution timings for respective tasks are determined in advance, the method comprising:

obtaining a proficiency of a worker with respect to a task to be performed from a proficiency storage unit of a computer memory storing, for each of workers, proficiencies with respect to tasks performed in the operation and determined corresponding to a difference between an output time of guidance related to a task and a task record time for the task;

correcting a guidance base time which is determined based on an operation schedule and an output time to a worker having an ordinary level of proficiency, and determining a guidance control time corresponding to the proficiency of the worker with a computer processor;

instructing an output device to output the guidance to the worker at the guidance control time with a computer processor;

creating task record information containing a task content and a task time of a task performed by the worker with a computer processor;

correcting the proficiency of the worker with respect to the task based on the guidance control time of the guidance and the task time contained in the task record information with a computer processor; and updating the proficiency of the worker with respect to the task stored in the proficiency storage unit with a computer processor, wherein in the obtaining of a proficiency, a latest proficiency is obtained from the proficiency storage unit when the proficiency of the worker with respect to the task to be performed is updated.

9. A computer program residing on a non-transitory computer readable medium causing a computer to execute processing for giving guidance leading to the start of tasks to a worker carrying out an operation in which execution timings for respective tasks are determined in advance, the computer program causing the computer to execute:

obtaining a proficiency of a worker with respect to a task to be performed from a proficiency storage unit storing, for each of workers, proficiencies with respect to tasks performed in the operation and determined corresponding to a difference between an output time of guidance related to a task and a task record time for the task;

correcting corresponding to the proficiency of the worker a guidance base time determined based on an operation schedule and an output time for a worker having ordinary proficiency, and determining a guidance control time corresponding to the proficiency of the worker;

instructing an output device to output the guidance to the worker at the guidance control time;

creating task record information containing a task content and a task time of a task performed by the worker;

correcting the proficiency of the worker with respect to the task based on the guidance control time of the guidance and the task time contained in the task record information; and updating the proficiency of the worker with respect to the task stored in the proficiency storage unit, wherein in the obtaining of a proficiency, a latest proficiency is obtained from the proficiency storage unit when the proficiency of the worker with respect to the task to be performed is updated.

\* \* \* \* \*